United States Patent Office 2,978,789
Patented Apr. 11, 1961

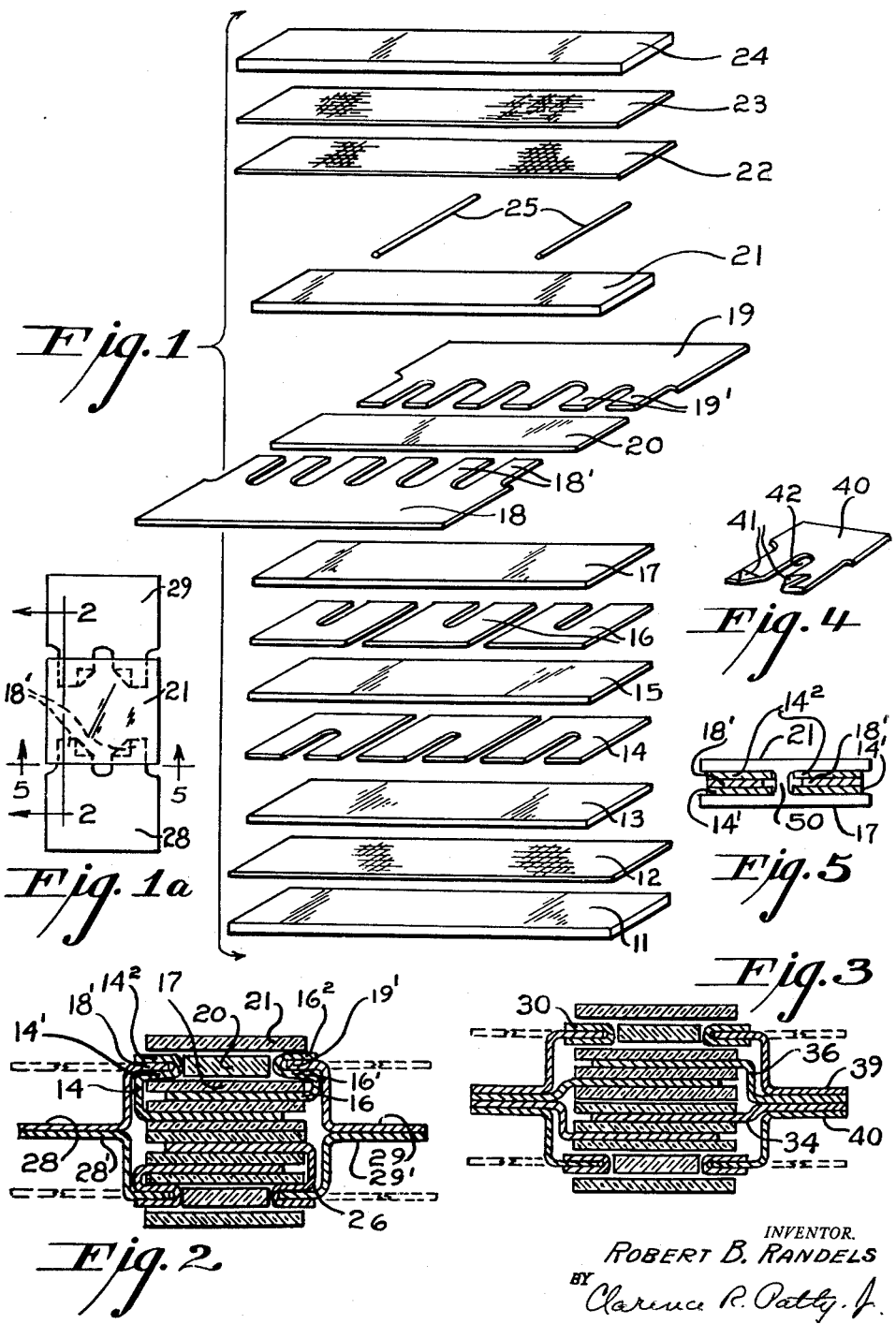

2,978,789

ELECTRICAL CONDENSERS AND THEIR MANUFACTURE

Robert B. Randels, Painted Post, N.Y., assignor to Corning Glass Works, Corning, N.Y., a corporation of New York Application Feb. 17, 1958, Ser. No. 715,801, which is a division of application Ser. No. 421,871, Apr. 8, 1954. Divided and this application Nov. 9, 1959, Ser. No. 851,731

1 Claim. (Cl. 29—25.42)

The present invention relates to methods of manufacture of electrical condensers of the type which comprises a vertical pile or stack of alternate layers of glass and metal foil and is a division of application Serial No. 715,801, filed February 17, 1958 and which is a division of application Serial No. 421,871, filed April 8, 1954.

Patent No. 2,526,704 describes a method of manufacturing groups of the foregoing form of condensers by embodying a number of laterally spaced stacks of metal foil elements or sheets alternately in a stack of glass foil ribbons, passing the so-formed assembly or strip through a furnace where the glass is softened and the assembly pressed into an integral mass, and subsequently laterally separating the same into individual condenser assemblies. In such condensers the metal foil elements or sheets of alternate layers thereof project from the opposite lateral margins of the glass ribbons and are simply brought together and serve as the terminals thereof.

Patent No. 2,696,577 discloses similar condensers assembled in like fashion but, in lieu of projecting the metal foil sheets themselves beyond the glass ribbon edges, provides a flexible extension from each metal foil element or sheet. These flexible extensions then extend from between top and bottom glass cover elements and serve as the terminals of the assembly.

In accordance with the present invention the metal foil elements or sheets of alternate layers thereof project from the opposite lateral margins of glass ribbon or foil elements of the stack, as in Patent No. 2,526,704, but are respectively joined to one another in electrical contact with terminal lugs respectively having portions sandwiched between a glass cover element and glass foil elements of the stack along such lateral margins. Actual contact of the lugs with the cover glass element or with the glass ribbons of the capacitor stack is prevented by folding the projected portions of such metal foil elements over those portions of the lugs that are arranged between the cover element and the adjacent glass foil elements of the stack. In such form of construction the metal foil seals to the glass but not to the lug and therefore permits small movement of the lug relative to the cover strip and the stack proper during temperature changes without damage to the assembly resulting from differential explansion of the parts. Such an arrangement enables the safe use of lugs of many times the combined thickness of the metal foils with which they are associated. Moreover it permits use of lugs made of metals of differing expansion than the stack assembly per se.

Preferably a mechanical interlock is provided between the lugs, and the remainder of the assembly. In accordance with the invention such interlock is obtained by forming bosses on the cover side of the metal foil covered portions of each lug and by providing the lug and the lug protecting metal foil with aligned apertures or other forms of passages so that, during the sealing and pressing of the foil and glass elements thereof to one another and to the cover, such bosses become embedded in the glass cover while glass from the cover passes through such passages and joins the last applied glass foil strip to rivet the lug to such parts. If desired, in lieu of relying on glass from the cover to effect riveting, beads of glass can be arranged at the passage entrances preceding placement of the glass cover. Such beads subsequently deform during sealing and pressing of the stack to form glass rivets that unite with the last applied glass foil strip and the glass cover. Obviously further interlocking of the parts can be obtained by otherwise suitably embossing or corrugating the portions of the lugs that are sandwiched between the cover element and the stack.

An extremely simple expedient of anchoring the lugs to the assembly is to provide each lug and its protecting metal foil with aligned apertures or slots which can serve as a glass rivet passage, and to fold over corners of the lug to form shallow teeth thereon which with its metal foil covering will be embedded in the glass cover strip as the assembly is heated and compressed.

It is possible to assemble, heat treat, and press a strip of condenser assemblies embodying two cover elements, double or two-layer terminal assemblies, and the necessary intermediate layers of glass foil and metal foil sheets to obtain any desired electrical capacity. Where close capacitance tolerances are desired, it is preferred however to initially assemble strips with only one of the cover elements and only one layer of a two-layer terminal lug embodied therein, and containing only such number of metal foil sheets as are necessary to produce condensers of approximately one half the capacity desired. In this way it is possible to calibrate and pair the respective half capacity condenser assemblies in a fashion to obtain a higher selection of condensers within a desired capacitance range. These matched or paired halves can then be arranged with their exposed glass strips facing one another and joined to one another by cementing and/or through the medium of their respective terminal lug assemblies.

In the form of assembly wherein separate metal foils protect the lugs from direct contact with the cover and the last glass foil strip of a stack, the projecting metal foil sheet ends are sandwiched between the respective layers of the terminal lugs and the whole joined together, preferably by welding.

In the form of assembly wherein the metal foil sheet ends are folded about the lugs, the paired lugs may simply be brought into direct engagement with each other and joined.

In the accompanying drawing, in order to make a clear showing of the respective condenser parts, their true thickness dimensions have been wholly disregarded. Typical thickness of the glass foil employed in practice, however, cover a range of .001 to .005 inch. Typical terminal lug or strip thicknesses range from .005 to .040 inch. The metal foil sheets, which usually are of aluminum, ordinarily are of approximately .003 inch in thickness. The glass cover strip thickness is a matter of choice, but usually ranges between .010 and .050 inch.

In the drawing Fig. 1 is an exploded perspective view of a condenser strip assembly embodying the invention as arranged on a suitable support and as covered with equipment to accompanying it during its passage through a furnace in which the assembly is heated to the softening temperature of the glass thereof and pressed to final form in known manner (Patent No. 2,526,704).

Fig. 1a is a plan view of a single condenser assembly embodying the invention.

Fig. 2 is a transverse sectional elevation taken on line 2—2 of Fig. 1a and of a similar assembly inverted and combined therewith.

Fig. 3 is a view, similar to Fig. 2 of an alternative form of the invention.

Fig. 4 is a perspective view of a single terminal lug of a condenser assembly showing corners thereof bent back upon itself to serve as anchoring bosses thereon.

Fig. 5 is a sectional view of a fragment of an assembly taken on line 5—5 of Fig. 1a, showing the rivet of glass formed between the glass cover element and the top glass foil of such assembly.

Referring now to Fig. 1, a strip of sheet metal 11 having arranged thereon a chalked asbestos pad 12, as in past practice, comprises a support for a condenser strip assembly. The first layer of such assembly in the present example comprises a ribbon or strip 13 of glass foil. Individual condenser elements or sheets 14 of metal foil are then arranged in laterally spaced relation on strip 13 with their bifurcated ends projected well beyond one edge of the strip for connection with terminal lugs similarly projected from the assembly. A second strip of glass foil 15 is then superimposed on sheets 14 and vertically aligned with strip 13. The next layer of the assembly is composed of laterally spaced metal foil sheets 16 having their bifurcated ends projecting from the opposite edges of strips 13 and 15 for connection with terminal lugs similarly projected from the assembly. A third glass foil strip 17 is then arranged over sheets 16 in vertical register with strips 13 and 15. The number of alternate layers of metal foil sheets and glass foil strips employed is of course determined by the capacitance of the condensers desired. For the purpose of simplicity a condenser strip having but two layers of metal foil sheets has been shown in Fig. 1. After placement of strip 17 on sheets 16 one of two alternative procedures is usually followed.

It will first be assumed that the assembly is to conform to the view shown in Fig. 2. Under these circumstances the projecting ends (Fig. 2) $14^1$—$14^2$ and $16^1$—$16^2$ respectively of metal sheets 14 and 16 are folded back over glass foil 17. The toothed portions such as 18' and 19' of lug strips 18 and 19 are then placed over the outer half portions such as 14' and 16' of the respective folded over sheets 14 and 16. The remaining exposed portions $14^2$ and $16^2$ of such sheets are then folded back over the lug portions such as 18' and 19'. The space between the foil covered lug portions 18' and 19' is substantially filled by a glass strip 20 after which such lug portions are bridged by a glass cover strip 21 which is also in vertical register with strips 13, 15 and 17. Obviously, if desired, the strips 20 and 21 may be made integral.

If desired, the glass cover 21 can be replaced with a cover comprising a stack of glass and metal foil elements corresponding for example to elements 13 through 17. Under these circumstances such stack is piled on a temporary support and the projecting ends of metal foil elements such as 14 and 16 are folded back over the top glass foil strip. The thus formed stack is then inverted and arranged on the stack of Fig. 1 in lieu of cover 21. As will be evident such stack, in addition to adding to the capacity of the condenser, is of sufficient rigidity to function as does the cover 21, to hold the terminal lug strips 18 and 19 firmly anchored to the remainder of the stack.

Wires 25 are arranged on top of the glass cover strip 21, or over the stack replacing such strip, transverse thereto over the spaces between the respective metal sheets such as 16 and along the desired lines of severance as taught in Patents Nos. 2,526,703 and 2,526,704. Also, as in past practice, wires 25 and the underlying assembly are next covered with a chalked asbestos pad 22, which is then covered with a pad 23 of coarsely woven material of glass or asbestos cloth or the like, a pressing plate 24 placed thereover and the whole passed through an assembly heating and pressing furnace.

As can best be seen in Fig. 5 each aligned passage, such as that between the lug portions 18' and between the folded over portions $14^1$ and $14^2$ of a metal foil sheet such as 14 (Fig. 2), is occupied by a link or rivet of glass 50 joining and integral with cover 21 and glass foil strip 17. As hereinbefore pointed out such rivet may comprise glass extruded from cover 21 during the heating and pressing of the strip assembly or it may comprise glass from a bead or stick of glass cane (not shown) included in the passage before placement of cover 21 or a cover in the form of a stack on the assembly.

The strip assembly, after issuing from the furnace, is divided into individual condensers or into laterally spaced groups in two steps. Lateral separation of the terminal lug strips is effected by shearing them along lines coextensive with the wires 25. Lateral separation of the remainder of the assembly is effected in the regions occupied by the respective wires in the fashion taught by Patent No. 2,526,703.

As hereinbefore pointed out the individual condensers so formed may then be selectively paired in accordance with their respective capacities and employed as sub-assemblies in which their corresponding lugs are brought into engagement with one another. For example, as illustrated in Fig. 2, the lugs 28 and 29 of one such sub-assembly and 28' and 29' of a similar sub-assembly have been so combined as to thus form a condenser with two-layer terminal assemblies.

If the condenser assemblies are to conform to that shown in Fig. 3 as claimed in divisional application Ser. No. 715,801, the method of assembly is modified to the extent that in lieu of folding the metal sheet ends, such as $14^1$—$14^2$ and $16^1$—$16^2$ about the terminal lug strip portions 18' and 19', separate strips of metal foil, such as 30, are folded about such strip portions. The projecting ends of the metal foil sheets such as 34 and 36 and corresponding to sheets such as 16 and 26 of Fig. 2 are subsequently sandwiched between the associated terminals 39 and 40 of two such condenser sub-assemblies.

As illustrated in Fig. 1a and in Fig. 4 in lieu of providing the lugs with anchoring bosses on their cover side as hereinbefore suggested, they may have their corners, such as 41, folded over to serve as such bosses.

What is claimed is:

The method of manufacturing a condenser assembly which includes assemblying a stack of glass and metal foil elements with each alternate metal foil element arranged between two of the glass foil elements projecting from one lateral edge of the glass foil elements and the remaining foil elements projecting from the opposite lateral margin thereof, arranging metal foil over the marginal portions of the surface of the top glass foil element and over terminal lug portions by first folding the end portions of the foil elements of the stack over such glass foil element and, after arranging portions of terminal lugs over part of such metal foil portions, folding the remaining exposed portions of such metal foil elements over such lug portions, bridging such portions of the terminal lugs with a glass cover, heating the assembly to the softening temperature of the glass to bond the metal and glass foil elements, and the cover into a unitary mass with the metal foil covered terminal lug portions gripped between the cover and the pile of glass and metal foil elements of the stack.

References Cited in the file of this patent

UNITED STATES PATENTS

| | | |
|---|---|---|
| 1,767,412 | Sprague | June 24, 1930 |
| 2,696,577 | Smith | Dec. 7, 1954 |